UNITED STATES PATENT OFFICE.

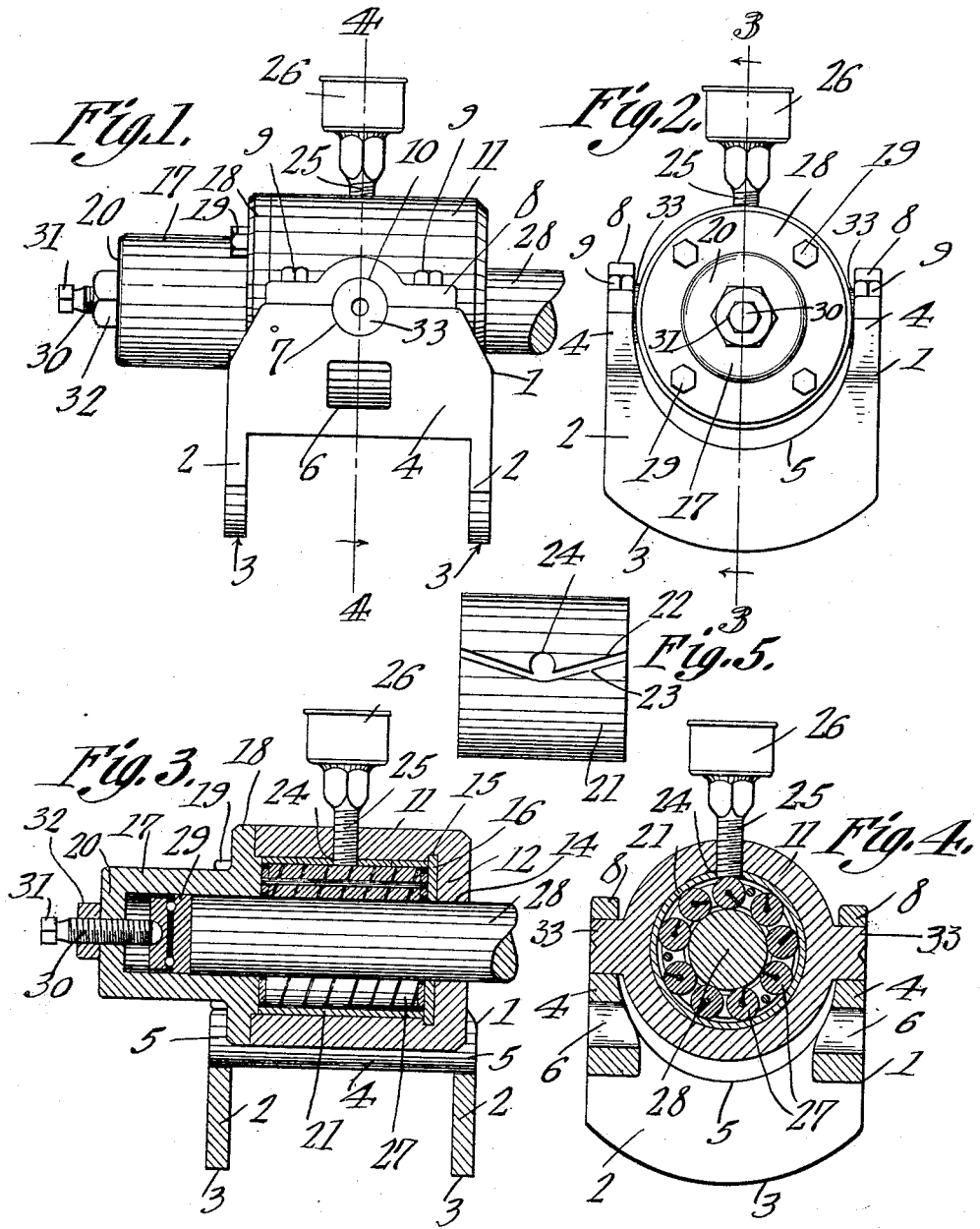

CLARENCE DAVIS TERRELL, OF COVINGTON, GEORGIA.

ROLLER-BEARING.

1,203,434.  Specification of Letters Patent.  Patented Oct. 31, 1916.

Application filed February 28, 1916. Serial No. 80,969.

*To all whom it may concern:*

Be it known that I, CLARENCE D. TERRELL, a citizen of the United States, residing at Covington, in the county of Newton and State of Georgia, have invented a new and useful Roller-Bearing, of which the following is a specification.

The device forming the subject matter of this application is a roller bearing adapted to be used on a cotton seed linter to receive the brush shaft, saw shaft and idler shaft.

The invention aims to provide novel means whereby a roller bearing may be assembled with the saw shaft, brush shaft and idler shaft of a linter to permit the necessary adjustments in the position of each shaft, the construction being such that an end thrust stop for the shaft is provided, it being possible to lubricate the shaft and, at the same time, to keep lint and dust away from the shaft.

The invention aims to improve generally in structural features which will be pointed out hereinafter, a roller bearing of the type described.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawing:—Figure 1 shows the invention in side elevation; Fig. 2 is an end elevation; Fig. 3 is a longitudinal section taken approximately on the line 3—3 of Fig. 2; Fig. 4 is a cross section taken approximately on the line 4—4 of Fig. 1; Fig. 5 is a fragmental top plan of the sleeve.

In carrying out the present invention there is provided a housing denoted generally by the numeral 1 and embodying end walls 2, the lower edges 3 of which are convexed, the housing 1 comprising side walls 4 connecting the end walls 2, the side walls being cut away or concaved between the end walls, as shown at 5. In the side walls 4, openings 6 are fashioned, for the purpose of facilitating the assembling of the housing with the linter-frame (not shown). In the upper edges of the side walls 4 of the housing 1, bearing notches 7 are formed. Disposed above and upon the side walls 4 are caps 8, held in place by securing elements 9 and shaped as shown at 10 to coöperate with the bearing notches 7 in the side walls.

Disposed between the side walls 4 of the housing is a tubular casing 11 provided with trunnions 33 received in the bearing notches 7 and in the portions 10 of the caps 8, the construction being such that the casing 11 is assembled with the housing 1 for endwise rocking movement. The casing 11 comprises a forward end wall 12 having an opening 14, the casing being provided with a circumscribing recess 15 receiving a ring 16 which may be made of felt or any other suitable material.

The casing 11 comprises a removable tubular extension 17 embodying a foot plate 18 secured to one end of the casing 11 by means of attaching elements 19. The extension 17 includes an end wall 20.

Disposed within the contour of the casing 11 is a sleeve 21, one end 23 of which is concaved, the other end 22 of which is convexed, as clearly shown in Fig. 5, the end 22 of the sleeve being provided with an opening 24 adapted to receive the stem 25 of an oil cup 26 assembled with the casing 11. Disposed within the contour of the sleeve 21 and coöperating therewith is a roller bearing 27 which need not be described in detail, since it is patented in combination with the sleeve 21 and forms no portion of the present invention, saving in so far as it may coöperate, generally, with elements hereinbefore described and hereinafter set forth.

Mounted to rotate in the opening 14 of the casing 11 and anti-frictionally supported by the bearing 27 is a shaft 28, one end of which passes into the extension 17 of the casing 11. Disposed within the extension 17 of the casing and abutting against the end of the shaft 28 is an end thrust bearing 29 engaged by the inner end of a screw 30, threaded into the part 20, the outer extremity of the screw 30 being squared as shown at 31, so that it may be rotated readily. Threaded onto the screw 30 and engaging the outer face of the part 20 of the casing is a lock nut 32.

The construction above described is such that the shaft 28 is supported for free rotation it being possible to adjust the shaft endwise through the instrumentality of the screw 30, the bearing 29 accommodating the end thrust of the shaft 28. The shaft 28 may be lubricated readily by means of the oil cup 26 and its stem 25, the ring 16 serving to prevent the oil thus introduced into the casing 11 from leaking away through the opening 14. As hereinbefore stated, the shaft 28 and the casing 11 may have a slight rocking movement, owing to the fact that the trunnions 33 of the casing are mounted to swing upon the side walls 4 of the housing 1.

The device forming the subject matter of this application permits a known form of roller bearing to be used advantageously in connection with linters, and the construction is such that friction will be reduced and wear avoided.

The structure herein disclosed will require little attention and can be operated at a high speed. The parts are interchangeable and a means is provided whereby the end thrust of the shaft will be taken up.

In order to accommodate the structure forming the subject matter of this application, no appreciable or extensive alterations are called for in standard linters.

Importance is attached to the special shape and construction of the housing 1, in that it will readily take the place of linter bearings now in use on standard machines. The housing 1 fits exactly in the place of old linter bearings and even makes use of the bolts that are a part of the equipment of standard linter machines. It is with this end in view that the openings 6 are provided.

Having thus described the invention, what is claimed is:—

A device adapted to supply an anti-frictional journaling for a shaft which is located at a fixed distance from a support, and adapted to replace an ordinary friction journaling for the shaft, the device including a housing comprising side walls and end walls, the end walls being extended downwardly below the lower edges of the side walls to form, with the lower edges of the side walls, a support-receiving recess; the housing being open at the bottom; a tubular casing having trunnions which are mounted in the side walls; and a tubular anti-friction bearing mounted in the casing.

In testimony that I claim the foregoing as my own, I have hereto affixed my signature in the presence of two witnesses.

CLARENCE DAVIS TERRELL.

Witnesses:
J. B. TERRELL,
W. T. ADAMS.

Copies of this patent may be obtained for five cents each, by addressing the "Commissioner of Patents, Washington, D. C."